(12) United States Patent
Asamizu et al.

(10) Patent No.: US 12,198,419 B2
(45) Date of Patent: Jan. 14, 2025

(54) MEASUREMENT SYSTEM AND PROGRAM

(71) Applicant: MITUTOYO CORPORATION, Kanagawa (JP)

(72) Inventors: Takanori Asamizu, Kanagawa (JP); Masaaki Shimizu, Hokkaido (JP)

(73) Assignee: MITUTOYO CORPORATION, Kanagawa (JP)

( * ) Notice: Subject to any disclaimer, the term of this patent is extended or adjusted under 35 U.S.C. 154(b) by 566 days.

(21) Appl. No.: 17/522,132

(22) Filed: Nov. 9, 2021

(65) Prior Publication Data
US 2022/0180097 A1 Jun. 9, 2022

(30) Foreign Application Priority Data
Dec. 3, 2020 (JP) .................................. 2020-201370

(51) Int. Cl.
*G06V 20/00* (2022.01)
*G01B 5/28* (2006.01)
(Continued)

(52) U.S. Cl.
CPC .............. *G06V 20/00* (2022.01); *G06F 16/22* (2019.01); *G01B 5/0002* (2013.01); *G01B 5/28* (2013.01);
(Continued)

(58) Field of Classification Search
CPC .......... G06V 20/00; G06F 16/22; G01B 5/28; G01B 21/047; G01B 11/303;
(Continued)

(56) References Cited

U.S. PATENT DOCUMENTS

| 2011/0197665 A1 | 8/2011 | Sakata et al. |
| 2018/0372473 A1* | 12/2018 | Abe ..................... G01B 21/045 |
| 2019/0017797 A1* | 1/2019 | Tamai .................. G01B 21/047 |

FOREIGN PATENT DOCUMENTS

| JP | 5349364 | 11/2013 |
| JP | 2017106939 A * | 6/2017 |

(Continued)

*Primary Examiner* — Manish S Shah
*Assistant Examiner* — Christian T Bryant
(74) *Attorney, Agent, or Firm* — Greenblum & Bernstein, P.L.C.

(57) ABSTRACT

A measurement system includes: measurement target information database that stores measurement point information, including measurement conditions and guidance information for each measurement point, associated with the type of the measurement target; a measuring instrument that performs measurements on the measurement target; an image capturing unit that captures an image of a subject; a display unit; a measurement target identification unit that identifies the type of the measurement target based on the image captured by the image capturing unit; a measurement target information obtaining unit for obtaining the measurement point information corresponding to the type of the measurement target identified by the measurement target identification unit from the measurement target information database; and a setting unit that displays the guidance information included in the measurement point information obtained by the measurement target information obtaining unit on the display unit and sets the measurement conditions on the measuring instrument.

8 Claims, 5 Drawing Sheets

(51) Int. Cl.
    *G01B 21/00*         (2006.01)
    *G05B 19/042*       (2006.01)
    *G05B 19/401*       (2006.01)
    *G06F 16/22*        (2019.01)
    *G01B 5/00*         (2006.01)
    *G01B 11/30*        (2006.01)
    *G01B 21/04*        (2006.01)

(52) U.S. Cl.
    CPC ............ *G01B 11/303* (2013.01); *G01B 21/00* (2013.01); *G01B 21/047* (2013.01); *G05B 19/042* (2013.01); *G05B 19/401* (2013.01)

(58) Field of Classification Search
    CPC .... G01B 5/0002; G01B 21/00; G01B 19/401; G01B 19/042; G05B 19/401; G05B 19/042
    See application file for complete search history.

(56) References Cited

FOREIGN PATENT DOCUMENTS

| | | | | |
|---|---|---|---|---|
| WO | WO-2016009740 A1 * | 1/2016 | ............ | G06F 18/00 |
| WO | WO-2016136670 A1 * | 9/2016 | ............ | G01N 21/27 |

* cited by examiner

MEASUREMENT SYSTEM AND PROGRAM

CROSS-REFERENCE TO RELATED APPLICATION

This non-provisional application claims priority under 35 U.S.C. § 119(a) from Japanese Patent Application No. 2020-201370, filed on Dec. 3, 2020, the entire contents of which are incorporated herein by reference.

BACKGROUND

Technical Field

The present invention relates to a measurement system, and more particularly to a measurement program selection assist apparatus that enables the selection of a measurement program suitable for a measurement target (an object to be measured) by a measuring instrument.

Background Art

A variety of measuring instruments have been realized to measure and evaluate the dimensions, shape, surface properties, and the like of the measurement target (workpiece). These measuring instruments are used in product development and manufacturing. When using such a measuring instrument to perform measurements, it is necessary to set appropriate measurement conditions for the instrument in advance.

For example, when using a surface roughness measuring instrument to perform a measurement, it is necessary to set the measurement conditions (various setting parameters, calculation formulas for processing acquired data and calculating measurement results, evaluation criteria for measurement results, and the like) for each measurement target (and for each measurement point if the measurement target has multiple measurement points), and then perform measurement by placing the measuring instrument at the correct measurement point while referring to drawings and the like, to determine which part of each measurement target should be measured (see, for example, Japanese Patent No. 5349364).

SUMMARY OF THE INVENTION

Problems to be Solved by the Invention

However, it is time-consuming to set the measurement conditions using the input interface, e.g., physical buttons, touch panel, and the like, provided on the measuring instrument. In particular, in situations where measurement is repeated while changing the measurement conditions or where multiple measuring instruments are used for measurement, setting the measurement conditions requires a great deal of labor and is inefficient. In addition, it is necessary to perform measurement while referring to drawings and other documents to confirm the measurement points and conditions that are determined according to the type of measurement target, which is not very efficient.

In addition, when using multiple measuring instruments to measure multiple measurement points on a measurement target in parallel, it is necessary to set the correct measurement conditions for the measuring instrument used according to the measurement points and then measure the correct measurement points. Such an operation was very complicated and inefficient, and the possibility of mistakes was not low.

The present invention was made in consideration of the above issues and aims to provide a measurement system that facilitates the setting of measurement conditions to a measuring instrument and suppresses measurement errors or measurement failure.

Means for Solving the Problems

The measurement system according to an embodiment of the present invention includes: measurement target information database that stores measurement point information, including measurement conditions and guidance information for each measurement point, associated with a type (or model) of the measurement target; a measuring instrument that performs measurements on the measurement target; an image capturing unit that captures an image of a subject; a display unit; a measurement target identification unit that identifies the type of the measurement target based on the image captured by the image capturing unit; a measurement target information obtaining unit for obtaining the measurement point information corresponding to the type of the measurement target identified by the measurement target identification unit from the measurement target information database; and a setting unit that displays the guidance information included in the measurement point information obtained by the measurement target information obtaining unit on the display unit and sets the measurement conditions included in the measurement point information on the measuring instrument.

In the present invention, the measurement target information database may store a type identification code attached to the measurement target in association with the type of the measurement target. The measurement target identification unit may identify the type of the measurement target based on the type identification code that appears in the image of the measurement target captured by the image capturing unit.

In the present invention, when the measurement target information obtaining unit obtains measurement point information for a plurality of measurement points in a measurement target, the setting unit may assign an available measuring instrument to each measurement point, display guidance information corresponding to the assigned measurement point on the display of each measuring instrument, and set measurement conditions corresponding to the assigned measurement point on each measuring instrument.

In the present invention, the measurement target information database may store an individual identification code, which is different for each individual measurement target, associated with the individual measurement target. The measurement target identification unit may identify the individual measurement target based on the individual identification code. The measurement system may further include a measurement data storage unit that stores the measurement results by the measuring instrument in the measurement target information database in association with the individual identification code identified by the measurement target identification unit.

In the present invention, the measurement conditions stored in the measurement target information database may include data from design drawings that include drawing instruction symbols indicating the measurement conditions.

In the present invention, the measurement system may include multiple types of measuring instruments with different possible measurements. In this case, the setting unit may identify the measuring instrument that can perform measurement under the measurement condition included in the measurement point information and assign the identified measuring instrument to the measurement point to perform measurement under the relevant measurement condition.

In the present invention, the measurement system may include a control terminal configured to communicate with the measuring instrument. The image capturing unit, the measurement target identification unit, the measurement target information obtaining unit, and the setting unit may be provided in the control terminal, and the display unit may be provided in the measuring instrument.

In the present invention, the measurement system may further include a database apparatus that has the measurement target information database and is configured to communicate with the control terminal.

The program according to an embodiment of the present invention causes a computer to function as the control terminal in the above measurement system.

DETAILED DESCRIPTION OF THE EMBODIMENTS

An embodiment of the present invention is described below with reference to the drawings.

Figure 1:
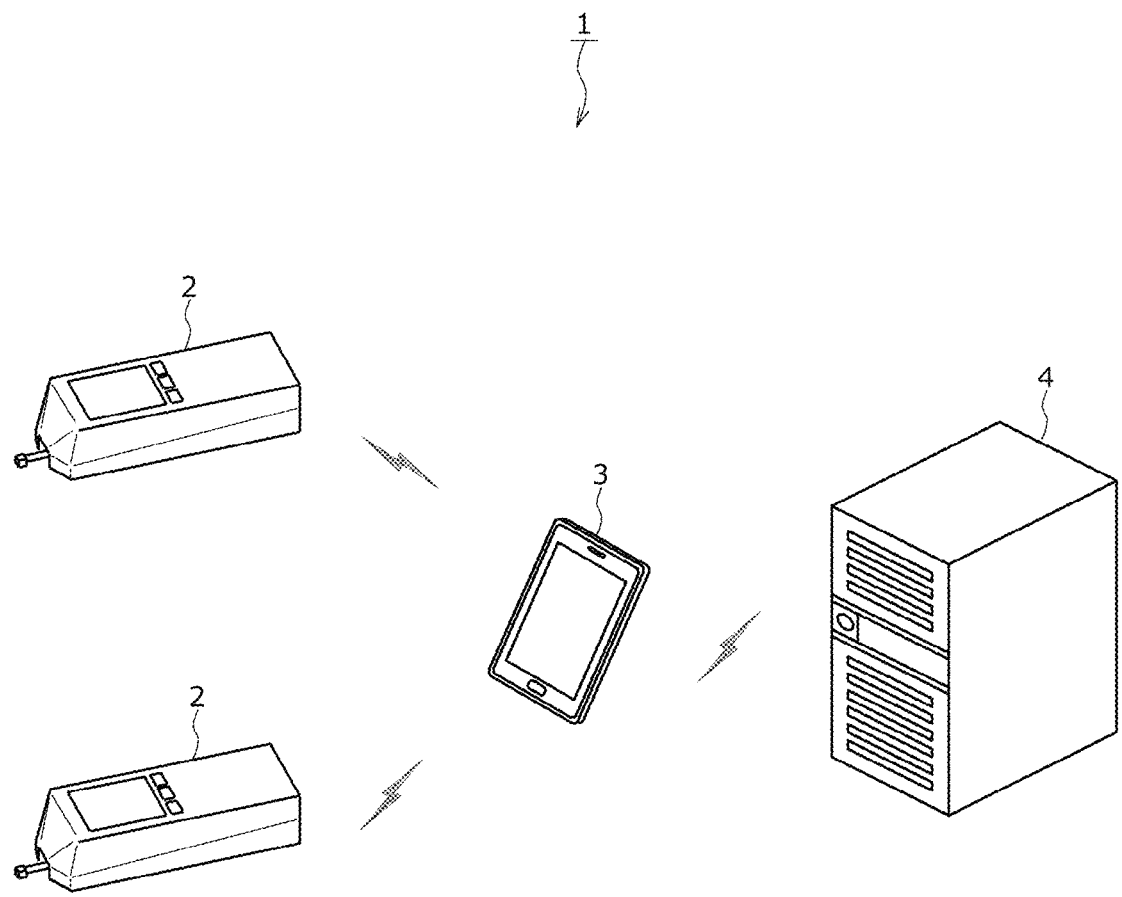
FIG. 1 shows a schematic diagram of the measurement system 1.

FIG. 1 schematically shows the configuration of a measurement system 1 of one embodiment of the present invention. As shown in FIG. 1, the measurement system 1 includes a measuring instrument 2, a control terminal 3, and a database apparatus 4.

Figure 2:
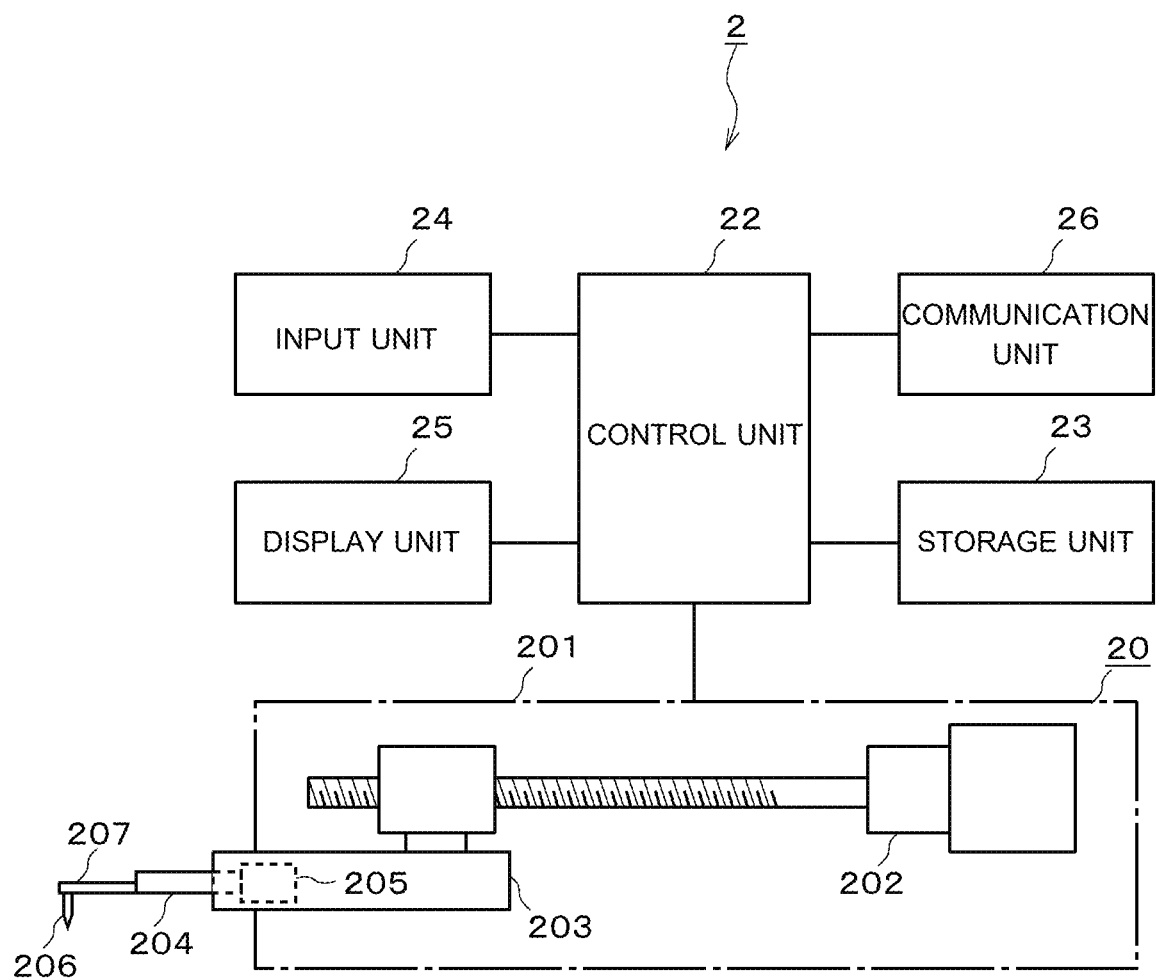
FIG. 2 shows the configuration of a handheld surface roughness measuring instrument as an example of measuring instrument 2.

The measuring instrument 2 performs measurements on a measurement target. FIG. 2 shows the configuration of a handheld surface roughness measuring instrument as an example of the measuring instrument 2. In this embodiment, the measurement system 1 is described using the example of a case in which two surface roughness measuring instruments are equipped as measuring instruments 2, but one or more measuring instruments 2 may be equipped. The measurement system 1 may also be equipped with a measuring instrument other than a surface roughness measuring instrument in addition to/substitution for the surface roughness measuring instrument as the measuring instrument 2.

The measuring instrument 2 includes a drive detection unit 20, a control unit 22, a storage unit 23, an input unit 24, a display unit 25, and a communication unit 26, as shown in FIG. 2.

As shown in FIG. 2 in detail, the drive detection unit 20 consists of a detection unit case 201, a driver 202 provided in the detection unit case 201, and a detector 203 that is driven by the driver 202 and moved linearly along the measurement direction.

The driver 202 may, for example, have a motor as a drive source fixed to the detection unit case 201 and rotate a feed screw shaft connected to the motor. The driver 202 may move the detector 203 linearly along the feed screw shaft by moving a nut member connected to the detector 203 and screwed to the feed screw shaft.

The detector 203 is equipped with a stylus arm 204 that is pivotably supported at the tip thereof. The detector 203 is equipped with a detection element 205 that detects the amount of swing of the base end of the stylus arm 204. At the tip of the stylus arm 204 is a stylus tip 207 with a stylus 206 protruding at a right angle to the axis of the stylus arm 204.

As the stylus 206 moves along the surface of the measurement target W, the stylus 206 is moved up and down depending on the surface properties (e.g., surface roughness) of the measurement target W. Then, the vertical movement of the stylus 206 is detected as a detection signal by the detection element 205, and the surface roughness of the measurement target W is measured from the detection signal accompanying this vertical movement and the distance traveled by the stylus 206 in the trace direction, i.e., the direction in which the driver 202 moves the detector 203 in a straight line.

The control unit 22 is a processor, such as a CPU (Central Processing Unit), which executes the program stored in the storage unit 23 to control each component of the measuring instrument 2 to realize various functions of the measuring instrument 2.

The storage unit 23 is a storage medium such as HDD or flash memory and stores various programs executed by the control unit 22, measurement conditions set by the operation on the input unit 24 or communication with the control terminal 3, guidance information, and data obtained by measurement. For example, the storage unit 23 may store a measurement program to control the drive detection unit 20 according to the set measurement conditions and perform the measurement, a user interface program to provide an operation interface to the user based on the display screen of the display unit 25 and input to the input unit 24, and so on.

The input unit 24 is an input means to receive operations by the user. The measuring instrument 2 in this embodiment is equipped with physical buttons and a touch panel. Touch panels include an electrostatic type that detects by contacting a conductive object (e.g., capacitive method) and a type that detect when the touch panel is pressed down (e.g., resistive method), but any type of touch panel can be used as long as it can detect contact or pressing at multiple positions simultaneously.

The display unit 25 is composed of a display device such as liquid crystal displays, organic EL displays, and the like. The display unit 25 is provided on the rear side, i.e., the side opposite to the side in contact with the measurement target W, of the housing of the measuring instrument 2. The touch panel of the input unit 24 is superimposed on the display unit 25, and the display unit 25 and the touch panel of the input unit 24 work together under the control of the control unit 22 to function as a so-called touch panel display.

The communication unit 26 is a communication interface that communicates with the control terminal 3. The communication with the control terminal 3 may be wired, but wireless communication is preferred. The communication unit 26 may, for example, communicate with the control terminal 3 via Bluetooth. The communication unit 26 transmits an advertisement signal at a predetermined interval (e.g., a cycle of several seconds) to inform its own information when establishing communication with the control terminal 3. The advertisement signal may include information indicating the type and model of the measuring instrument 2, identification of the individual measuring instrument 2, and the like.

Figure 3:
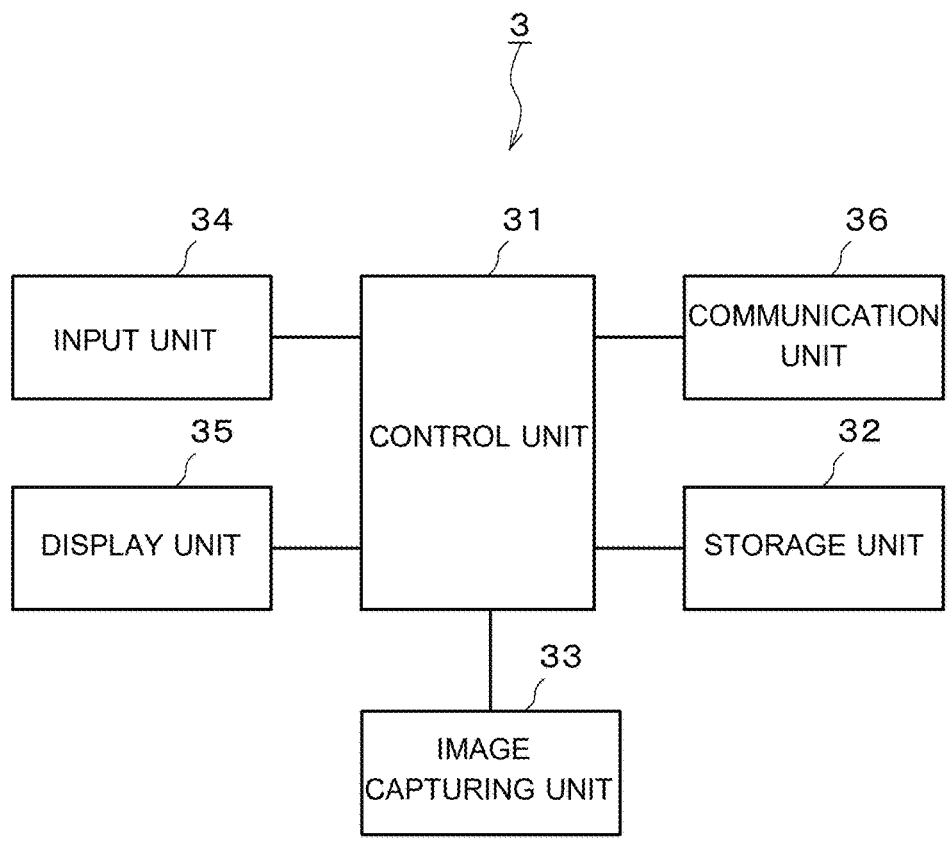
FIG. 3 shows a block diagram of the control terminal 3.

The control terminal 3 corresponds to the measuring instrument control device in the present invention, and is a terminal that provides measurement assist functions to help users smoothly perform measurements using the measuring instrument 2. The control terminal 3 can be realized by a portable information terminal such as a smartphone or a tablet device. FIG. 3 is a block diagram illustrating a configuration of control terminal 3. As shown in FIG. 3, the control terminal 3 includes a control unit 31, a storage unit 32, an image capturing unit 33, an input unit 34, a display unit 35, and a communication unit 36.

The control unit 31 is a processor, such as a CPU (Central Processing Unit), which executes the program stored in the storage unit 32 to control each component of the control terminal 3 to realize various functions of the control terminal 3.

The storage unit 32 stores the program executed by the control unit 31 and the data used in the program. For example, the storage unit 32 stores a measurement target identification program that identifies the type (or model) of the measurement target W based on the image of the measurement target W captured by the image capturing unit 33, a measurement target information obtaining program that obtains the measurement point information corresponding to the type of the measurement target W identified by the measurement target identification program from the measurement target information database DB stored in the storage unit 42 of the database apparatus 4 described below, a setting program that displays the guidance information included in the measurement point information obtained by the measurement target information obtaining program on the display unit 25 of the measuring instrument 2 and sets the measurement conditions included in the measurement point information on the measuring instrument 2, and so on. In other words, the control unit 31 realizes the functions of the measurement target identification unit, measurement target information obtaining unit, and setting unit in the present invention by executing the above programs stored in the storage unit 32. The details of each program will be described later, along with the operation of the measurement system 1.

The image capturing unit that captures an image of a subject. The image capturing unit 33 includes a solid-state image pickup device, such as a CMOS (Complementary Metal-Oxide Semiconductor) image sensor or CCD (Charge Coupled Device) image sensor, which converts the image of the subject into electrical signals and outputs them as image data. The image data output by the image capturing unit 33 is temporarily stored in the storage unit 32.

The input unit 34 is an input means to receive operations by the user. The control terminal 3 in this embodiment is equipped with physical buttons and a touch panel. Touch panels include an electrostatic type that detects by contacting a conductive object (e.g., capacitive method) and a type that detect when the touch panel is pressed down (e.g., resistive method), but any type of touch panel can be used as long as it can detect contact or pressing at multiple positions simultaneously.

The display unit 35 is composed of a display device such as liquid crystal displays, organic EL displays, and the like.

The display unit 35 is provided on the front of the housing of the control terminal 3. The touch panel of the input unit 34 is superimposed on the display unit 35, and the display unit 35 and the touch panel of the input unit 34 work together under the control of the control unit 31 to function as a so-called touch panel display.

The communication unit 36 is a communication interface that communicates with the measuring instrument 2 and the database apparatus 4. The communication with the measuring instrument 2 may be wired, but wireless communication is preferred. The communication unit 36 may, for example, communicate with the measuring instrument 2 via Bluetooth. The communication with the database apparatus 4 can also be wired, but wireless communication is preferred. The communication unit 36 may, for example, communicate with the database apparatus 4 by wireless LAN or Wifi. The communication unit 36 may communicate with the measuring instrument 2 and the database apparatus 4 using a common method.

Figure 4:
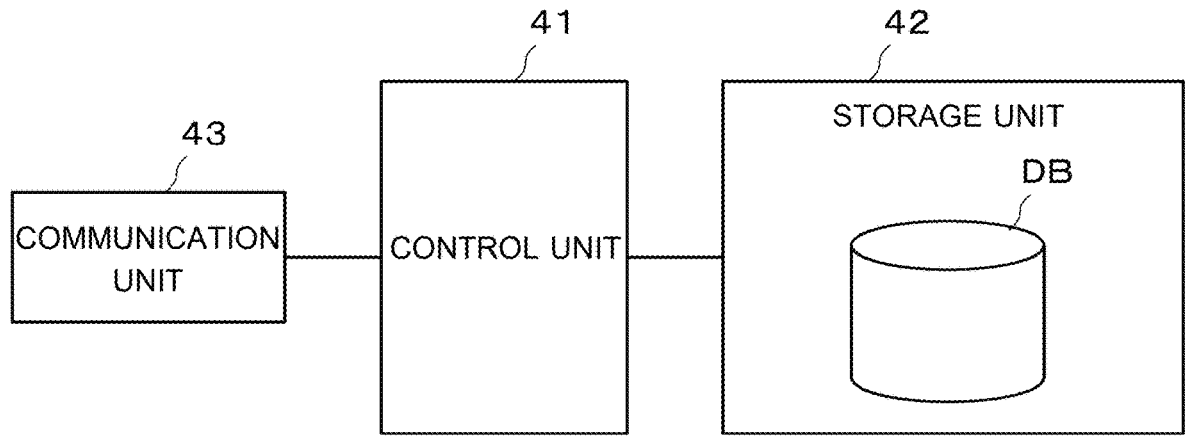
FIG. 4 shows a block diagram of the database apparatus 4.

The database apparatus 4 is, for example, a computer system and consists of an input/output device such as a keyboard, mouse, touch panel, and the like, a main body equipped with an arithmetic unit such as a CPU (Central Processing Unit) and storage devices such as RAM (Random Access Memory) and ROM (read-only memory), and a display device such as a CRT (Cathode Ray Tube) or LCD (Liquid Crystal Display). FIG. 4 is a block diagram illustrating a configuration of database apparatus 4.

As shown in FIG. 4, the database apparatus 4 includes at least a control unit 41, a storage unit 42, and a communication unit 43. The control unit 41 is a processor, such as a CPU, that executes programs and controls the processing in the database apparatus 4 in a comprehensive manner.

The storage unit 42 stores the program executed by the control unit 41 and the data used in the program. For example, the storage unit 42 stores the measurement target information database DB that stores the measurement point information in association with the type identification code that identifies the type (or model) of the measurement target W. The measurement point information may include the measurement conditions for the measurement point on the measurement target W and guidance information to guide the user to the measurement point. The measurement target information database DB may store information on multiple measurement points in association with one type of measurement target W. The measurement conditions may include various parameters to be set for the measuring instrument 2 and formulas to calculate the measurement results. The measurement conditions include, for example, parameters that define the conditions for data acquisition by the drive detection unit 20, parameters that define the conditions for calculating a desired measurement result from the acquired data, a parameter that defines the pass/fail judgment conditions for the measurement result, and the like. The parameters that define the conditions for data acquisition by the drive detection unit 20 are, specifically, the moving speed of the detector 203 at the time of measurement, the measurement range, and the evaluation length, and the like. The parameters that define the conditions for calculating a desired measurement result from the acquired data are, specifically, the type of roughness standard, the type of roughness parameter, the filter applied to the data, and the like. The parameters that define the pass/fail criteria for the measurement result are, specifically, the upper and lower limits of the pass range of the measurement results. Alternatively, the measurement conditions may be data in the design drawing of the measurement target W. In this case, it is possible to analyze the design drawing to recognize the drawing instruction symbols and acquire the measurement conditions based on the drawing instruction symbols. The guidance information may include photographs of the measurement points, drawings of the measurement points, CAD data and explanatory text. The measurement target information database DB may also store information indicating the location of the measurement point (e.g., coordinates), CAD data, and the like, in association with the measurement target W.

The storage unit 42 stores a database management program for performing operations on the measurement target information database DB. When the database management program is executed by the control unit 41, for example, the measurement conditions and guidance information for the inquired measurement target W are extracted from the measurement target information database DB in response to an inquiry from the control terminal 3.

The communication unit 43 is a communication interface that communicates with the control terminal 3. The communication with the control terminal 3 may be wired, but wireless communication is preferred. The communication unit 43 may, for example, communicate with the control terminal 3 by wireless LAN or Wifi.

The database apparatus 4 does not have to be physically composed of each of the above components as a single unit. For example, some or all the above components may be distributed in remote locations, and they can work together to function as a database apparatus 4. Or the database apparatus 4 may be configured as an integral part of the control terminal 3 or the measuring instrument 2.

Operation of Measurement System

Next, the operation of the measurement system 1 will be explained using the example of a case where two measuring instruments 2 are used to measure two measurement points on a measurement target W. In this example, it is assumed that a QR code containing a type identification code to identify the type of the measurement target W is affixed to the measurement target W. In addition, the measurement point information (i.e., measurement conditions, guidance information, and the like) is stored in advance in the measurement target information database DB of the database apparatus 4 in association with the type identification code of the measurement target W.

Figure 5:
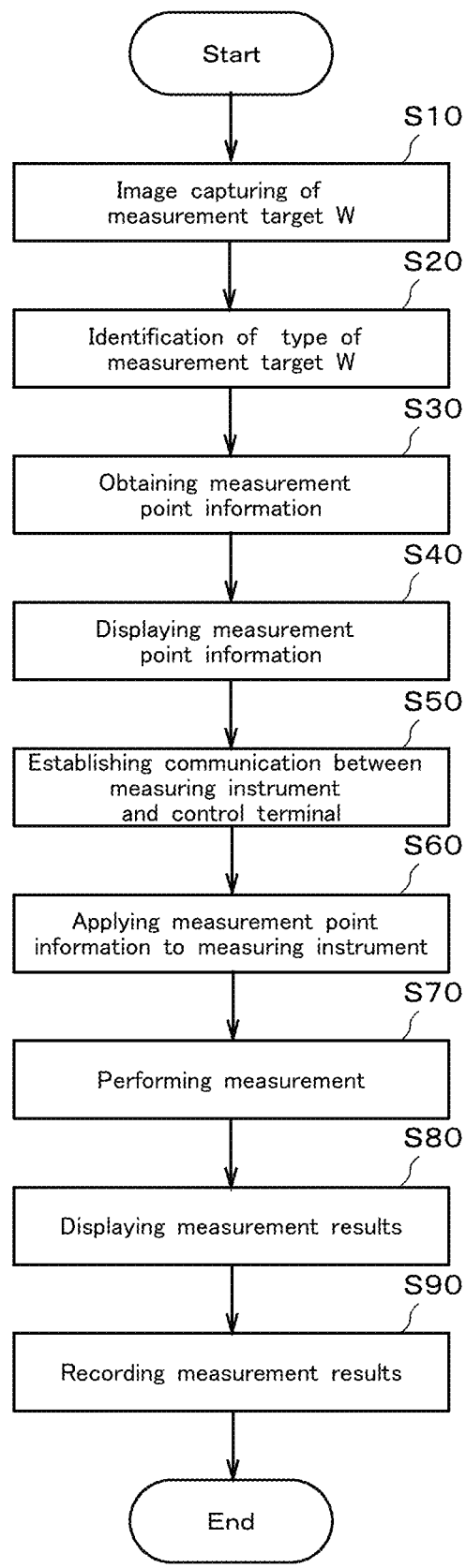
FIG. 5 shows a flowchart illustrating the procedure to perform measurement of the measurement target W using the measurement system 1.

FIG. 5 shows a flowchart illustrating the procedure to perform measurement of the measurement target W using the measurement system 1 of the present embodiment.

Initially, the user takes an image of the measurement target W using the control terminal 3 (Step S10). At this time, the image to be captured should show the QR code affixed to the measurement target W. Then, the control unit 31 of the control terminal 3 executes the measurement target identification program for the image captured in step S10, and identifies the type of the measurement target W in the image (step S20). Then, the control unit 31 of the control terminal 3 queries the measurement target information database DB in the storage unit 42 for the type of the measurement target W identified in step S20, and obtains the measurement point information corresponding to the type (step S30).

Figure 6:
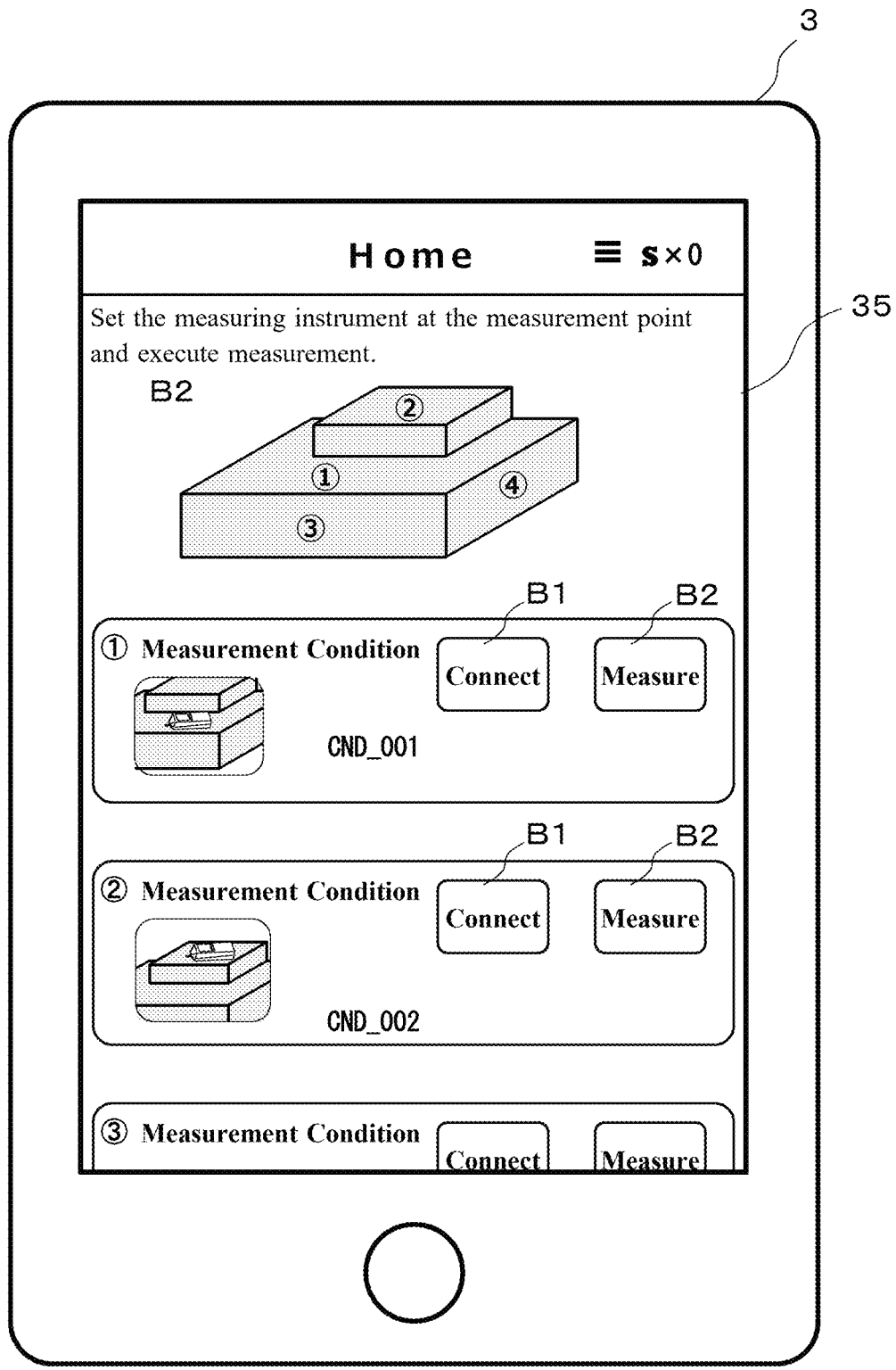
FIG. 6 shows an example of the display screen of the measurement point information in the display unit 35.

The control unit 31 displays the measurement point information about the measurement target W obtained in step S30 on the display unit 35 (step S40). FIG. 6 shows an example of the display screen of the measurement point information in the display unit 35. For example, as shown in FIG. 6, a list of measurement points may be shown along with the appearance (overall image) of the measurement target W with marks (numbers, or the like) attached to the measurement points. The operation interface (connection button B1 and measurement button B2) used in the later steps is displayed corresponding to each measurement point.

Then, on the operation interface of the display unit 35 displayed in step S40, the measurement is executed by performing the following steps S50 to S90 in sequence for the desired measurement point.

First, the user establishes communication between the communication unit 36 and the communication unit 26 by pressing the connection button B1 for the desired measurement point on the operation interface of the display unit 35 (Step S50). Specifically, when the connection button B1 is pressed, the communication unit 36 scans the advertisement signals transmitted from the communication unit 26 of the surrounding measuring instrument 2, and makes a connection request to the measuring instrument 2 that has been found and can be used to measure the measurement point, and establishes communication. If more than one measuring instrument 2 is found that can be used for measurement are found, communication may be established with any one of them. The measurement system 1 may include multiple types of measuring instruments 2 with different possible measurements. The "measuring instrument 2 that can be used for measurement" means measuring instrument 2 that can perform measurements under the measurement conditions for the target measurement point. The control unit 31 of the control terminal 3 identifies such "measuring instrument 2 that can be used for measurement," assigns the identified measuring instrument 2 to the measurement point where measurement under the measurement conditions is to be performed and establishes communication.

When there are multiple measurement points on the measurement target W, pressing the connection button B1 for one measurement point may assign an available measuring instrument 2 to each measurement point, including measurement points other than the measurement point for which the connection button B1 was pressed, display the guidance information corresponding to the assigned measurement point on the display of each measuring instruments 2, and set the measurement conditions corresponding to the assigned measurement point on each measuring instruments 2. In this way, the time and effort required to perform Step S50 for each measurement point can be avoided.

Then, in step S60, the control terminal 3 sends measurement point information (i.e., measurement conditions and guidance information) for the target measurement point to the measuring instrument 2 with which communication has been established, and the measurement point information is applied to the measuring instrument 2. In other words, the measurement conditions are stored in the storage unit 23 of the measuring instrument 2, and the guidance information is displayed on the display unit 25 of the measuring instrument 2. The user appropriately positions the measuring instrument 2 at the measurement point of the measurement target W while looking at the guidance information displayed on the display unit 25. The guidance information may also be displayed on the display unit 35 of the control terminal 3.

After going through step S60, when the measurement is ready, the user presses the measurement button B2 on the operation interface of the display unit 35 to perform the measurement using the measuring instrument 2 (step S70). In other words, the control unit 22 of the measuring instrument 2 controls the drive detection unit 20 to acquire measurement data, and furthermore, the control unit 22 obtains measurement results from the measurement data according to the calculation formula and criteria for judgment included in the measurement conditions.

The measurement results obtained by the control unit 22 are displayed on the display unit 25 and sent to the control terminal 3 via the communication unit 26. The measurement results are also displayed on the display unit 35 of the control terminal 3 (Step S80). The measurement results displayed on the display unit 35 may be displayed in correspondence with the measurement point.

The measurement results obtained by the control terminal 3 from the measuring instrument 2 are transmitted to the database apparatus 4 via the communication unit 36 and stored in the storage unit 42 of the database apparatus 4 by the user pressing the save button displayed on the display unit 35 together with the measurement results or by other operations (Step S90).

If there are unmeasured measurement points, the process is returned to Step S50. If the measurement has been completed for all measurement points, the measurement of the measurement target W is terminated.

With the configuration and operation described above, the measurement system 1 of the present embodiment can set the measurement conditions quickly and accurately by having the control terminal 3 extract the measurement conditions for each measurement point of the measurement target W from the measurement target information database DB of the database apparatus 4 and transfer them to the measuring instrument 2. In addition, guidance information indicating how to place the measuring instrument 2 at the measurement point is displayed on the display unit 25 of the measuring instrument 2, so that the user can correctly place the measuring instrument 2 at the measurement point of the measurement target W without hesitation.

Modification of Embodiment

Although the embodiments of the present invention are described above, the present invention is not limited to these examples. For example, in the above embodiment, the QR code includes a type identification code, but the QR code may also include an individual identification code to identify the individual of the measurement target W, in addition to/substitution for the type identification code to identify the type of the measurement target W. QR codes may contain only the individual identification code or only the type identification code. Even when only the individual identification code is included, if the measurement target information database DB stores the type of the measurement target W in association with the individual identification code, it is possible to identify the type of the measurement target W from the individual identification code.

In a configuration where the individual of the measurement target W can be identified, the measured values may be recorded in the measurement target information database DB in association with the individual identification code of the measurement target. The control terminal 3 may send the measurement results to the database apparatus 4 after the measurement is performed and record the said measurement results in association with the individual identification code. In this way, it will be possible to trace the measurement results for each individual measurement target later.

In the above embodiment, an example of identifying the type of the measurement target W (type identification code) based on the QR code on the image of the measurement target W was described, but the type of the measurement target W may be specified based on the appearance or 3D shape of the measurement target W. Specifically, the program executed by the control terminal or the database apparatus 4 can be configured to identify the type of the measurement target W by comparing the reference model of the shape of the measurement target W (CAD data, image, and the like) with the appearance of the measurement target W in the image.

In the above embodiment, the measurement system 1 is composed of three types of hardware: a measuring instrument 2, a control terminal 3, and a database apparatus 4, but some of these may be integrated into a single piece of hardware. For example, the measuring instrument 2 and the control terminal 3 may be realized by a single piece of hardware.

In the above embodiment, a measurement procedure in which the measurement system 1 measures a plurality of measurement points in a single measurement target W in sequence by the measuring instruments 2 was described as an example, but a plurality of measurement points in a measurement target W may be measured simultaneously or in parallel by a plurality of measuring instruments 2. In the above embodiment, a measurement button B2 is provided for each measurement point on the operation interface displayed on the display unit 35. However, in this case, instead of/in addition to the measurement button B2, a batch measurement button is provided to perform batch measurement on the measuring instruments 2 for which connection and setting of measurement conditions have been completed, and when this batch measurement button is pressed, measurement is performed on a plurality of measurement points that are ready for measurement. In this way, the preparation for measurements is done all at once, and multiple measurement points are measured at once, thereby simplifying the operation required for measurement and reducing the measurement time can be achieved.

Instead of batch measurement, the measurement system may be configured to perform measurements on multiple measurement points that are ready for measurement in a predetermined order in response to a single measurement execution operation. Such sequential measurement is effective when a simultaneous measurement is not desirable due to vibration during measurement.

Further, an invention in which a person skilled in the art appropriately add, delete, or change the design of the above-described embodiments, or a combination of the features of the respective embodiments as appropriate is also included in the scope of the present invention as long as it has the gist of the present invention.

What is claimed is:

1. A measurement system comprising:
   a measurement target information database, including at least a processor and a memory, that stores measurement point information, including measurement conditions and guidance information indicating how to place a measurement instrument for a plurality of measurement points associated with a type of a measurement target;
   multiple measuring instruments with displays, wherein the measuring instruments perform measurements on a measurement target;
   an imaging sensor configured to capture an image of a subject;
   a display; and
   a controller, including at least a processor, configured to:
      identify the type of the measurement target based on the image captured by the imaging sensor;

obtain the measurement point information corresponding to the type of the measurement target identified from the measurement target information database;

display the guidance information included in the measurement point information obtained on the display and set the measurement conditions included in the measurement point information on the measuring instrument for the measurement target;

establish communication with the measuring instruments;

assign an available measuring instrument to each measurement point;

display guidance information corresponding to the assigned measurement point on the display of the assigned measuring instrument; and set measurement conditions corresponding to the assigned measurement point on the assigned measuring instrument.

2. The measurement system according to claim 1, wherein the measurement target information database stores a type identification code attached to the measurement target in association with the type of the measurement target, and the controller is further configured to identify the type of the measurement target based on the type identification code that appears in the image of the measurement target captured by the imaging sensor.

3. The measurement system according to claim 1, wherein:

the measurement target information database stores an individual identification code, which is different for each individual measurement target, associated with the individual measurement target; and the controller is further configured to:

identify the individual measurement target based on the individual identification code; and store the measurement results by the respective measuring instrument in the measurement target information database in association with the individual identification code identified.

4. The measurement system according to claim 1, wherein the measurement conditions stored in the measurement target information database include data from design drawings that include drawing instruction symbols indicating the measurement conditions.

5. The measurement system according to claim 1, wherein the controller is further configured to identify a measuring instrument that can perform measurement under the measurement condition included in the measurement point information and assigns the identified measuring instrument to the measurement point to perform measurement under the relevant measurement condition.

6. The measurement system according to claim 1, further comprises a control terminal, wherein the imaging sensor and controller are provided in the control terminal, and the display is provided in the measuring instrument.

7. The measurement system according to claim 6, further comprises a database apparatus that includes the measurement target information database and is configured to communicate with the control terminal.

8. A non-transitory computer readable storage medium storing a program for causing a computer to function as the control terminal in the measurement system as claimed in claim 6.

* * * * *